Dec. 18, 1928.

B. T. INSLEY 1,695,849

REVERSIBLE TRACTOR TRANSMISSION

Filed Aug. 2, 1927      2 Sheets-Sheet 1

INVENTOR

*B.T.Insley*

BY

ATTORNEY

Dec. 18, 1928.

B. T. INSLEY 1,695,849

REVERSIBLE TRACTOR TRANSMISSION

Filed Aug. 2, 1927     2 Sheets-Sheet 2

INVENTOR
B.T. Insley
BY
ATTORNEY

Patented Dec. 18, 1928.

1,695,849

UNITED STATES PATENT OFFICE.

BIRDDINE T. INSLEY, OF STOCKTON, CALIFORNIA.

REVERSIBLE TRACTOR TRANSMISSION.

Application filed August 2, 1927. Serial No. 210,053.

This invention relates to improvements in tractors of the wheel type and particularly to the transmission mechanism between the engine and the driven wheels.

Such mechanisms, in this type of tractor, include a train of gears to transmit the power from the engine shaft to the driven axles, and since the work of tractors is all done when moving in one direction, the teeth of the various gears engage each other continuously on one face. As a result, wear develops only on said one face and is unequal.

The principal object of my invention therefore is to provide a transmission structure which may be reversibly mounted in connection with the engine of the tractor when desired, so that the gear teeth then bear against each other on their opposite faces, while the engine still turns in the same direction, and the tractor still moves forwardly.

A further object is to provide a supporting structure for the transmission mechanism itself arranged to be inverted in position on the tractor, so that the various gears mounted in said structure are reversed upon the inverting of the structure and the individual gears are not touched when making the change. This inverting of the supporting structure enables the reversing operation of the entire mechanism to be carried out in a very short time and, of course, also causes the bearings of the various gear shafts to be inverted in position so that the wear is transferred from the bottom to the top half of such bearings, and becomes equalized with the continued use of the tractor.

Still another object of the invention is to construct the supporting structure of castings arranged in such a manner that the cost of pattern work, casting and machining of the parts may be kept very low and the various gears may be quickly and easily mounted therein or removed therefrom.

A further object is to arrange the entire invertible structure so that reversing operations may be carried out without having to change or disturb the positions of practically any of the other parts of the tractor.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
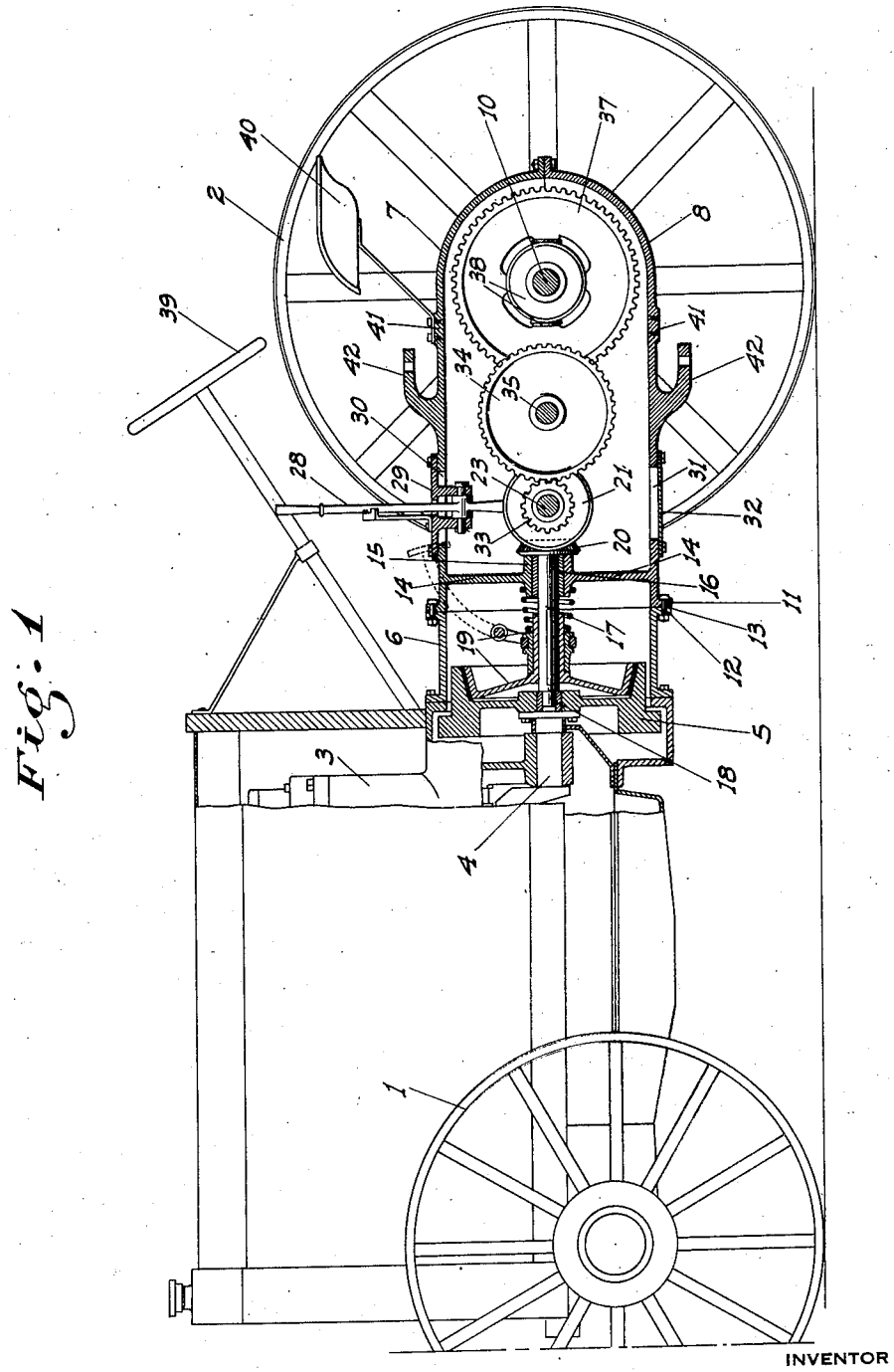
Fig. 1 is a side view of a tractor showing my improved reversible transmission thereon.
Figure 2:
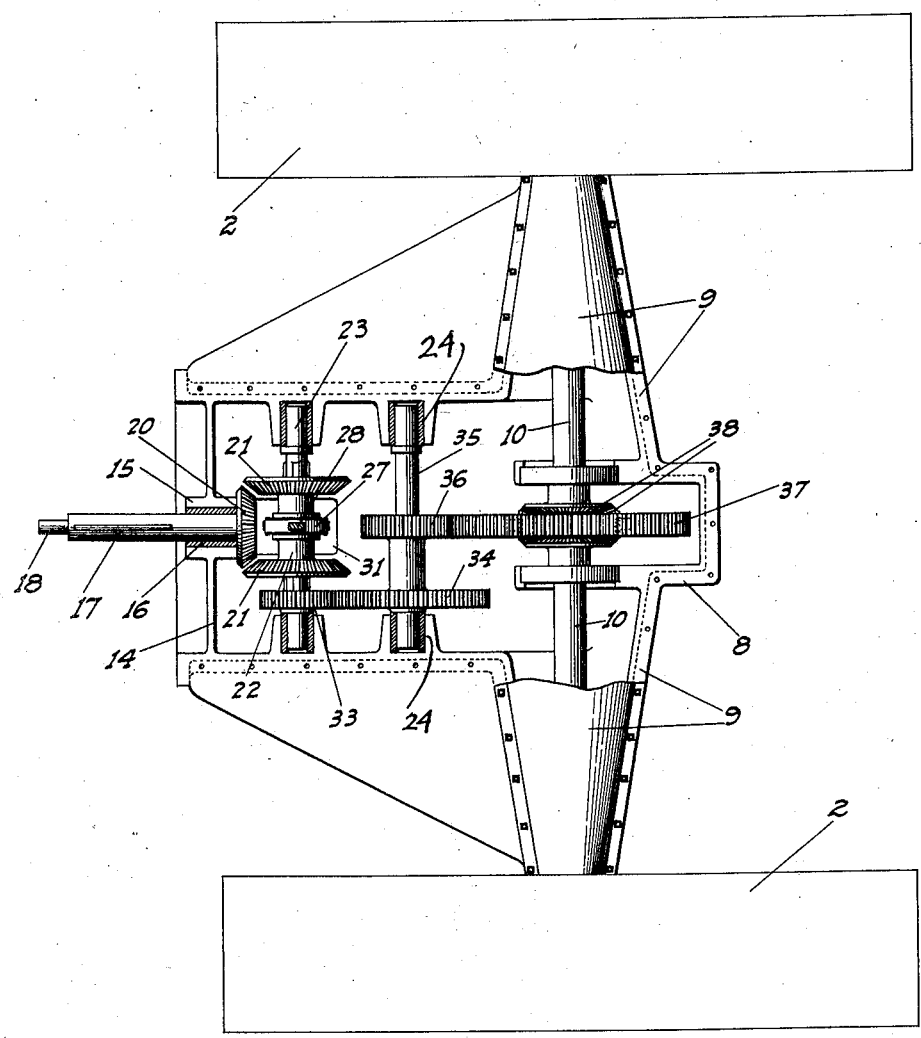
Fig. 2 is a top plan view of the invertible unit detached and with the upper member of the casing removed.
Figure 3:
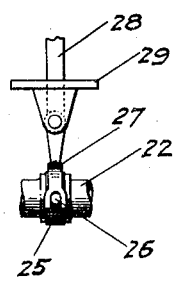
Fig. 3 is a fragmentary end view showing the detachable engagement of the reverse lever with the shifting collar.

Referring now particularly to the numerals of reference on the drawings, the tractor shown comprises essentially front wheels 1, rear wheels 2, and engine 3 and a transmission mechanism between the engine and the rear wheels and which includes as is common a structure for supporting the rear wheels from the engine and taking the place of a frame. It is with this supporting structure and the mechanism therein that my invention deals.

The engine has the usual crankshaft 4 and a flywheel 5 secured onto the rear end thereof and enclosed in a rigid but detachable housing 6.

My invertible mechanism supporting structure comprises a pair of symmetrical and oppositely disposed castings 7 and 8 arranged in superimposed relation to form a housing. These parts are securely but detachably bolted together along their abutting faces, which are in the longitudinal axial plane of the crankshaft 4.

At their rear ends, the housing sections are preferably formed with laterally and outwardly extending sleeves 9 in which the separated rear wheel axles 10 are mounted, these axles being also in the horizontal axial plane of the engine crankshaft. The housing sections at their forward ends are provided with outwardly projecting flanges 11 adapted to abut against the rear end flange 12 of the housing 6 and to be detachably secured thereto by bolts 13. It will therefore be seen that upon removing these bolts and turning the housing upside down, the setting of the housing and all parts therein relative to the engine will be inverted or reversed. The rear wheels will also be reversed but since the wheel axles are in the horizontal plane of the crankshaft, the horizontal setting of the tractor as a whole, when the housing is fixed in its inverted position, will not be disturbed. The housing sections, adjacent their forward ends, are provided with transverse webs 14 carrying bosses 15 on their adjacent ends which support a bearing 16 for a shaft 17 which is longitudinally alined with the crankshaft and has a reduced pilot 18 on its forward end to detachably engage the flywheel hub. Detachably splined on this shaft ahead of the bearing 16 is a clutch structure of suitable character, indicated at 19 and which as usual is manually controlled to place the crankshaft in driving engagement with the shaft 17. Rearwardly of the bearing 16 the shaft 17 carries a bevel pinion 20 adapted to be selectively engaged with bevel gears 21 arranged in opposed relation to each other and fixed in common on a sleeve 22. This sleeve is splined onto a transverse shaft 23 journaled at its ends in bearings 24 mounted in the casing sections. This shaft also is in the horizontal plane of the crankshaft. The sleeve 22 carries a shifting collar 25 having opposed trunnions 26 removably engaged by the forked ends of a yoke 27 formed as part of a vertical shifting lever 28. This lever is pivoted for transverse reciprocating movement, to slide the gear sleeve along its shaft, on a plate 29 removably secured onto the upper housing section 7 over an opening 30 therein. A similarly located opening 31 is provided in the lower housing section 8, covered by a removable plate 32. Thus when inverting the housing sections, the plate 29 is first removed, the lever disassociated from the shifting collar by an upward movement. When the sections are secured in their inverted position, the plate 32 is removed and the lever is inserted through the opening 31 (then uppermost) and reengaged with the shifting collar, and the plate 29 is bolted in place instead of the plate 32, which is then used to cover the opening 30. To one side of the gears 21, the shaft 23 carries a spur pinion 33 which meshes with a gear 34 mounted on a transverse countershaft 35 journaled in suitable bearings supported by the housing sections. This shaft is also located on the split-line between the sections, or in the axial plane of the crankshaft. The shaft 35 carries a spur pinion 36 meshing with a gear 37 mounted coaxially with the rear wheel axles 10 and connected in driving relationship therewith by means of a differential structure 38 of common form.

It is to be understood that the gear arrangement shown is for purposes of illustration only since it will be obvious that such arrangement is capable of considerable modification and enlargement. In any case, however, it will be evident that inverting of the housing enables the objects of the invention as set forth in the preamble to be fulfilled, with respect to the reversing of the engaging faces of the gear teeth with each other, to equalizing the wear on the bearings and to maintaining the parts reversed in the same horizontal plane at all times. The housing sections being symmetrical and duplicates of each other, a single pattern serves for both. The housings being split on the center lines of all the shafts, provides for very simple machining operations during manufacture, as will be evident to those in the industry; and enables which ever section is uppermost to be removed at any time without disturbing or dismantling the structure as a whole. This operation in turn permits any gear units to be removed if necessary.

With regard to the bearings for the various shafts, it is to be understood that while in the drawings a conventional bushing type has been shown, in practice roller or similar antifriction bearing units would preferably be used. None of the shafts project through the sides of the housing, so that the shaft-ends are not a source of oil leakage; and by the provision of the cross wall or web 14 at the front end of the housing, a quantity of lubricant may be maintained in the housing without the danger of the oil being splashed against the clutch, if this is of the dry plate type. To enable the inverting of the structure to be carried out with a minimum of trouble and removal of other parts of the tractor, the steering wheel 39 is supported from the tractor ahead of the reversible housings. The driver's seat 40, which must be positioned convenient to the steering wheel, reversing lever 28, and the clutch and other controls, is removably bolted onto one or the other of similarly disposed pads 41 provided on the housing sections. This seat and the lever 28, are the only parts whose positions must be changed when reversing the structure. To enable an implement to be attached to the tractor, similarly disposed drawheads 42 are provided on both housing sections, so that one or the other will be in position to be used regardless of the inverting of the housing.

To invert the housing, the forward housing 6 is supported by a jack and the bolts 13 are removed. The rear wheel and housing unit is then backed away so as to clear the shaft pilot 18 from the flywheel. The housing is then swung up and over to an inverted position about the rear wheel axles as an axis, and the structure is then turned around horizontally so as to again aline the housing 7—8 in its new position with the housing 6. The bolts 13 are again applied, and after the reverse lever and seat have been remounted, the tractor is again ready for service.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a tractor, a power plant having a crank shaft, a rear wheel axle, a transmission mechanism from the crankshaft to the axle, and a housing in which said mechanism and axle are mounted arranged to be invertedly mounted in connection with the power plant without disturbing the positioning of the crank shaft and axle relative to each other.

2. In a tractor, a power plant having a crank shaft, a housing provided with the power plant and surrounding the same, a rear housing to extend rearwardly from and to be detachably and invertedly connected onto the rear end of the first named housing, a rear axle supported by said rear housing, and a transmission mechanism mounted in the rear housing and being operatively connected to the crankshaft and axle.

3. A structure as in claim 2 in which the axle is disposed in the horizontal plane of the crankshaft.

4. A structure as in claim 2, in which the transmission mechanism includes transverse shafts; the rear housing being formed of a pair of separable and duplicate sections split on the horizontal plane of the crankshaft, and the shafts and axle being centered, along the line of split.

5. A structure as in claim 1, in which the transmission mechanism includes a transmission-motion reversing mechanism, and an actuating lever for said mechanism arranged to be interchangeably mounted on the top or bottom of the housing.

6. In a tractor, a power plant having a drive shaft, a driven axle at right angles thereto, and a transmission mechanism which includes a train of gears disposed between the power plant and the axle to transmit power from one to the other; and means for enabling said mechanism to be inverted in position as a unit relative to the power plant without altering the positioning of the shaft and axle relative to each other; whereby to reverse the direction of rotation of the gears and cause the teeth thereof to engage each other on their opposite faces, when the axle is turning in the same direction as prior to the inverting operation.

In testimony whereof I affix my signature.

BIRDDINE T. INSLEY.